(12) United States Patent
Soper et al.

(10) Patent No.: US 8,740,127 B2
(45) Date of Patent: Jun. 3, 2014

(54) CABLE RETRACTOR

(75) Inventors: Matthew Soper, Clayton, NC (US);
Craig Fitzpatrick, Knightdale, NC (US)

(73) Assignee: RGB Systems, Inc., Anaheim, CA (US)

(*) Notice: Subject to any disclaimer, the term of this patent is extended or adjusted under 35 U.S.C. 154(b) by 941 days.

(21) Appl. No.: 12/795,611

(22) Filed: Jun. 7, 2010

(65) Prior Publication Data
US 2011/0006146 A1    Jan. 13, 2011

Related U.S. Application Data

(60) Provisional application No. 61/186,346, filed on Jun. 11, 2009.

(51) Int. Cl.
*B65H 75/36*    (2006.01)

(52) U.S. Cl.
USPC ........................................................ 242/388.9

(58) Field of Classification Search
USPC .......... 242/372, 375, 385, 400, 388.9, 388.91
See application file for complete search history.

(56) References Cited

U.S. PATENT DOCUMENTS

| | | | |
|---|---|---|---|
| 1,468,620 A | 9/1923 | Addy | |
| 3,744,339 A | 7/1973 | Martinson | |
| 4,114,273 A | 9/1978 | McGaha | |
| 4,174,816 A | 11/1979 | Olson | |
| 4,850,240 A * | 7/1989 | White | 74/500.5 |
| 5,117,859 A | 6/1992 | Carlson | |
| 5,124,685 A | 6/1992 | Rankin | |
| 5,255,768 A | 10/1993 | Kasper | |
| 5,421,530 A | 6/1995 | Bertagna | |
| 6,419,175 B1 | 7/2002 | Rankin | |
| 7,617,840 B1 | 11/2009 | Zinda | |
| 8,113,085 B2 * | 2/2012 | Ruhlander et al. | 74/502.6 |
| 8,469,303 B2 * | 6/2013 | Feldstein et al. | 242/388.9 |
| 2007/0023557 A1 | 2/2007 | Rankin | |
| 2008/0000528 A1 | 1/2008 | Gunnarsson | |
| 2008/0055237 A1 | 3/2008 | Kim et al. | |
| 2008/0156922 A1 | 7/2008 | Rabinowitz et al. | |
| 2010/0062696 A1 | 3/2010 | Hart | |

FOREIGN PATENT DOCUMENTS

| | | |
|---|---|---|
| EP | 1331200 A1 | 7/2003 |
| GB | 590766 A | 7/1947 |
| WO | 98/26485 A1 | 6/1998 |

OTHER PUBLICATIONS

WIPO, Sep. 1, 2010, International Search Report and Written Opinion (ISR-WO).

(Continued)

*Primary Examiner* — William A Rivera
(74) *Attorney, Agent, or Firm* — The Hecker Law Group, PLC

(57) ABSTRACT

A cable retractor is provided. In accordance with at least one embodiment, the cable retractor is articulate, comprising an articulate housing which comprises a cable stop housing pivotably coupled to a pulley housing. In accordance with at least one embodiment, the cable retractor also comprises a first pulley assembly coupled to the pulley housing, an end cap coupled to the pulley housing, a spring coupled to the end cap, and a second pulley assembly coupled to the spring. In accordance with at least one embodiment, the first pulley assembly and the second pulley assembly are disposed within the pulley housing. In accordance with at least one embodiment, a cable stop assembly is coupled to the cable stop housing. In accordance with at least one embodiment, several of the parts are separable to facilitate installation or replacement of a cable.

30 Claims, 8 Drawing Sheets

(56) References Cited

OTHER PUBLICATIONS

Extron Electronics, "Extron Retractor Cable Retraction System for Cable Cubby® Enclosures: Brochure", Rev. A, May 2009, 2 pages, http://www.extron.com/download/files/brochure/retractor_bro_revA.pdf.

Extron Electronics, "Extron Retractor Cable Retraction System for Cable Cubby® Enclosures: Specifications", Rev. D2, May 19, 2009, 2 pages, http://www.aselgrup.com/product/Retractor_D2_051909.pdf.

U.S. Patent & Trademark Office, Written Opinion of the International Search Authority for International Application No. PCT/US2010/001675, Sep. 1, 2010, 5 pages.

European Patent Office, Extended European Search Report, Aug. 26, 2013, App. No. EP 10786504.0.

* cited by examiner

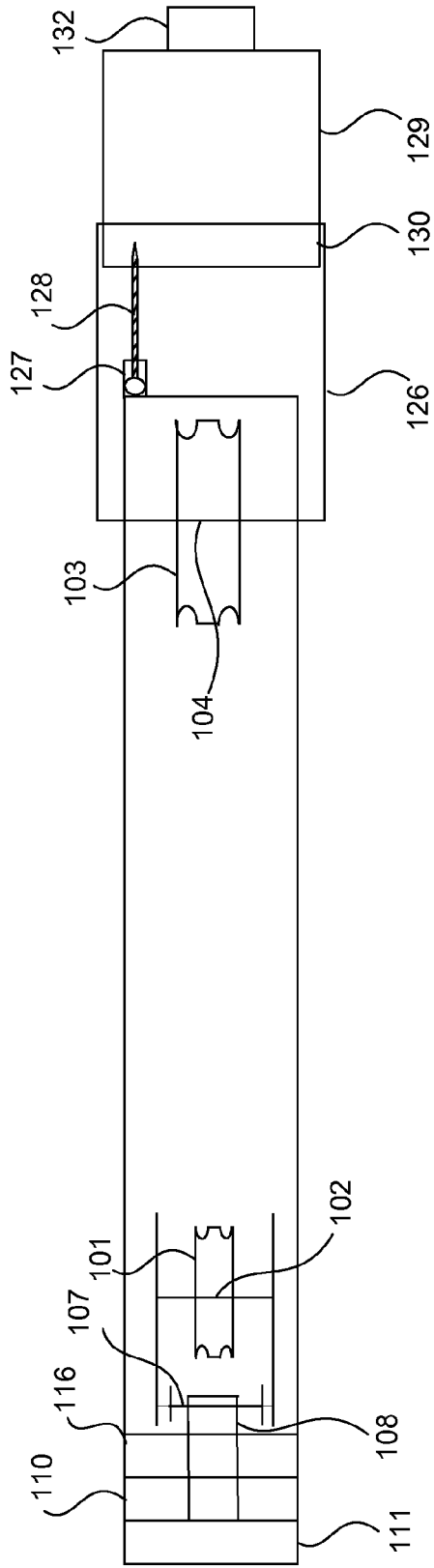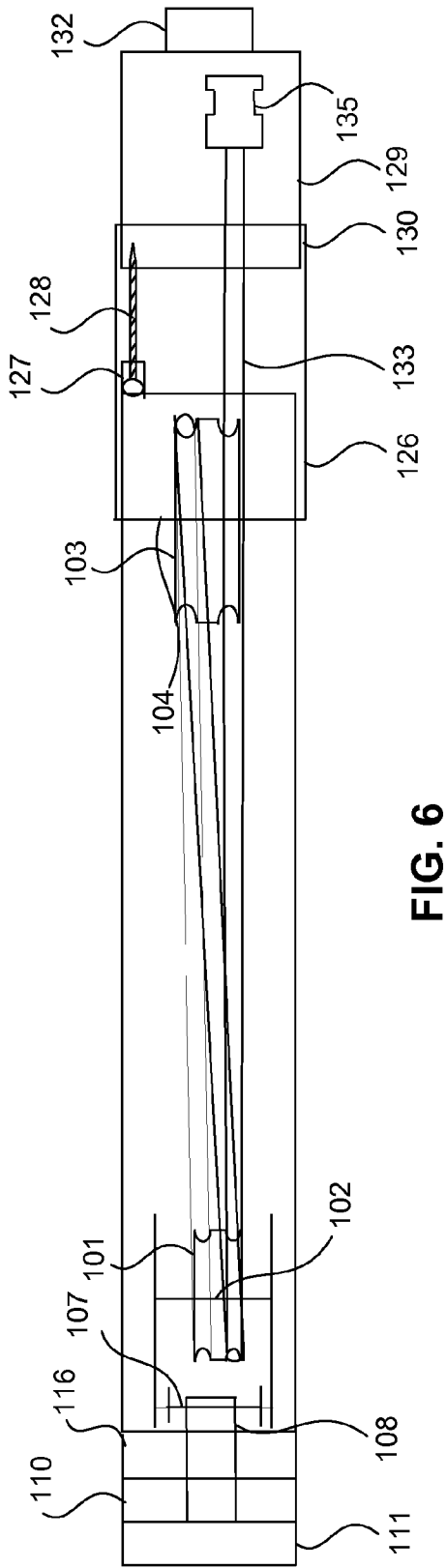

CABLE RETRACTOR

CROSS-REFERENCE TO RELATED APPLICATION

This patent application claims the benefit of the filing date of U.S. Provisional Patent Application No. 61/186,346 filed Jun. 11, 2009, which is incorporated by reference in its entirety herein.

BACKGROUND OF THE INVENTION (1) Field of the Invention

The present invention relates generally to mechanical apparatus for management of electrical cabling and, more specifically, to a cable retractor facilitating the extension and retraction of cabling.

(2) Description of the Related Art

Electronic equipment is typically interconnected by cables. Cables are often equipped with connectors that allow their connection to and disconnection from equipment. When cables are longer than necessary or are disconnected from equipment, they can be awkward and untidy. While cable retractors can be provided to take up slack, cable retractors are typically bulky and might not allow installation and/or replacement of a cable in the field. Thus, a cable retractor that avoids such disadvantages is needed.

BRIEF DESCRIPTION OF THE DRAWINGS

The present invention may be better understood, and its features made apparent to those skilled in the art by referencing the accompanying drawings.

FIG. 5 is a cross sectional drawing illustrating a cable retractor in accordance with at least one embodiment.

FIG. 6 is a cross sectional drawing illustrating a cable retractor with a cable installed in accordance with at least one embodiment.

The use of the same reference symbols in different drawings indicates similar or identical items.

DETAILED DESCRIPTION OF THE INVENTION

The present invention comprises a cable retractor. In accordance with at least one embodiment, the cable retractor is articulate, comprising an articulate housing which comprises a cable stop housing pivotably coupled to a pulley housing. In accordance with at least one embodiment, the cable retractor also comprises a first pulley assembly coupled to the pulley housing, an end cap coupled to the pulley housing, a spring coupled to the end cap, and a second pulley assembly coupled to the spring. In accordance with at least one embodiment, the first pulley assembly and the second pulley assembly are disposed within the pulley housing. In accordance with at least one embodiment, a cable stop assembly is coupled to the cable stop housing and a cable clamp assembly is coupled to the pulley housing. In accordance with at least one embodiment, several of the parts are separable to facilitate installation or replacement of a cable. For example, the cable stop assembly is separable, allowing a cable to be installed therein. As another example, the end cap is separable from the pulley housing. As yet another example, the cable clamp assembly is separable from the pulley housing.

In accordance with at least one embodiment, the spring comprises a spring that provides an approximately constant spring force. As one example, the spring is a coiled flat spring. In accordance with at least one embodiment, the cable retractor further comprises a damper coupled to the spring to control retraction speed. As one example, the damper is a rotary damper coupled to the spring and to the second pulley assembly.

Figure 1:
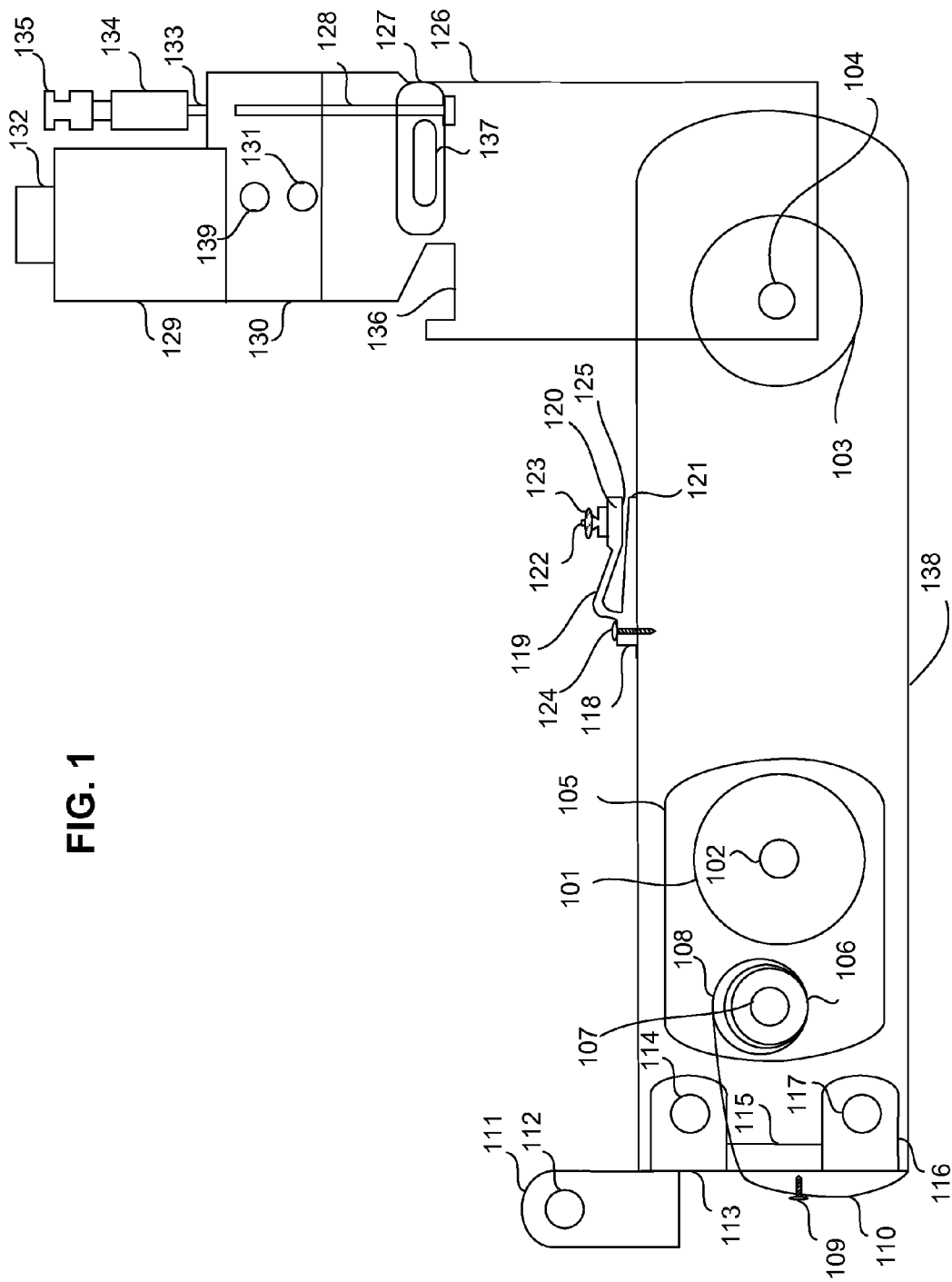
FIG. 1. is a cross sectional drawing illustrating a cable retractor in accordance with at least one embodiment.

FIG. 1. is a cross sectional drawing illustrating a cable retractor in accordance with at least one embodiment. The cable retractor comprises an articulate housing assembly comprising a cable stop housing 126 and a pulley housing 138. Cable stop housing 126 is pivotably coupled to pulley housing 138. For example, cable stop housing 126 and pulley housing 138 can be rotated with respect to each other about an axis, for example, the first pulley axle 104 of first pulley 103. Alternatively, a different axis than first pulley axle 104 of first pulley 103 may be used to pivotably couple cable stop housing 126 to pulley housing 138.

Figure 9:
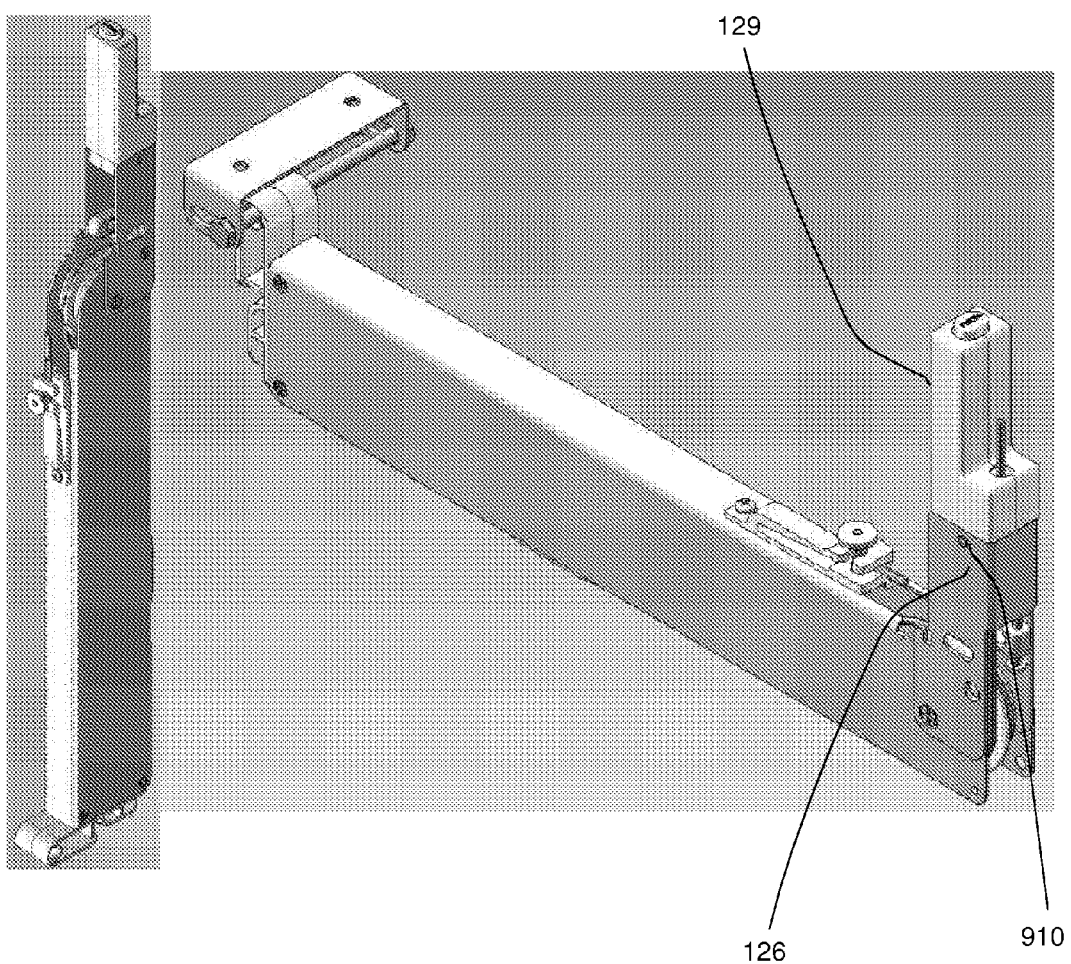
FIG. 9 is a perspective view showing an embodiment of a cable retractor of the invention.

A cable stop assembly 129 comprising a cable stop mechanism is coupled to the cable stop housing 126. In one or more embodiments, cable stop housing 126 is formed of sheet metal with a generally rectangular bore, as shown in FIG. 9. A mating portion 130 of cable stop assembly 129 (not visible in FIG. 9) engages (slides into) the rectangular bore of cable housing 126 and is secured by one or more cable stop assembly screws, which pass through holes defined in cable stop housing 126 and into the mating portion 130 of cable stop assembly 129. In the embodiment of FIG. 1, two screws 131 and 139 are used. In the embodiment of FIG. 9, a single screw 910 is used. Cable stop assembly 129 comprises a cable stop actuator button 132, which may be used to release the cable stop assembly 129 from frictionally detaining a cable 133 routed through cable stop assembly 129. When the cable stop assembly is released, the cable retractor exerts a motive force on cable 133 to retract cable 133 into the articulate housing. A cable stop collar 134 may be attached to cable 133 to prevent cable connector 135 from being pulled into contact with cable stop assembly 129. In one or more embodiments, cable stop collar 134 protects cable connector 135 and provides a grip surface by which cable 133 can be pulled to extend it from the cable retractor.

A cable access enclosure engagement notch 136 is defined in cable stop housing 126 to engage a cable access enclosure in which the cable retractor may be installed. The cable stop housing 126 also defines a cable access enclosure engagement slot 137 through which a rod or fastener may be inserted to secure the cable retractor to the cable access enclosure. A cable access enclosure mounting block 127 is disposed within cable stop housing 126 and also defines a slot substantially aligned with cable access enclosure engagement slot 137, and the rod or fastener inserted into cable access enclosure engagement slot 137 may also be inserted through the slot defined in cable access enclosure mounting block 127. A cable access enclosure mounting block screw 128 passes through an aperture defined in cable access enclosure mounting block 127 and engages cable stop assembly 129. The cable access enclosure mounting block screw 128 can be tightened to secure the cable access enclosure mounting block 127 to the rod or fastener that passes through the slot defined in cable access enclosure mounting block 127, thereby securing cable stop housing 126 to the cable access enclosure in which the cable retractor is installed.

A first pulley assembly comprising first pulley 103 and first pulley axle 104 are disposed within pulley housing 138. As second pulley assembly 105 comprising second pulley 101, second pulley axle 102, spring 108, spring axle 107, and rotary damper 106 is also disposed within pulley housing 138. In accordance with at least one embodiment, spring 108 is a constant force spring which exerts an approximately constant amount of force regardless of how far spring 108 has been extended or retracted within its working range of motion. For example, in accordance with at least one embodiment, spring 108 is a coiled flat spring in which a flat spring is coiled around spring axle 107, allowing spring 108 to rotate as spring 108 unwinds while spring 108 is being extended and winds around spring axle 107 as spring 108 is being retracted.

In accordance with at least one embodiment, a rotary damper 106, as known in the art, is provided to smooth the winding/unwinding of spring 108 about spring axle 107. In one or more embodiments, a tab on the inside diameter of spring 108 engages the hub of rotary damper 106 to provide engagement between spring 108 and rotary damper 106.

In accordance with at least one embodiment, spring 108 is partially unwound and placed through an aperture in end cap 115 and curved along a curved surface of spring mounting block 110, which may be integral with end cap 115. In accordance with at least one embodiment, spring 108 is connected to end cap 115 by spring mounting screw 109. Thus, second pulley assembly 105 is drawn closer to end cap 115 when spring 108 is relaxed and wound around spring axle 107 and is farther from end cap 115 when spring 108 is extended and unwound from spring axle 107. Spring 108 urges second pulley assembly 105 away from the first pulley assembly comprising first pulley 103.

In accordance with at least one embodiment, end cap 115 comprises first end cap lug 113, second end cap lug 116, and mounting lug 111. A first end cap lug aperture 114 is defined in first end cap lug 113. As second end cap lug aperture 117 is defined in second end cap lug 116. A screw is inserted through pulley housing 138 and first end cap lug aperture 114 to secure the end cap 115 to the pulley housing 138. Another screw is inserted through pulley housing 138 and second end cap lug aperture 117 to secure the end cap 115 to the pulley housing 138. Mounting lug 111 defines mounting lug aperture 112. A rod or fastener may be inserted through mounting lug aperture 112 to secure the cable retractor to the cable access enclosure in which the cable retractor is mounted.

In accordance with at least one embodiment, the cable retractor comprises a cable clamp assembly 118. Cable clamp assembly 118 is attached to pulley housing 138, for example, using cable clamp mounting screw 124. Cable clamp assembly 118 comprises cable clamp flexure 119, cable clamp movable engagement portion 120, and cable clamp fixed engagement portion 121, where cable clamp flexure 119 allows cable clamp movable engagement portion 120 to be moved relative to cable clamp fixed engagement portion 121 to allow cable 133 to be installed in or removed from cable clamp aperture 125 defined between cable clamp movable engagement portion 120 and cable clamp fixed engagement portion 121. A cable clamp threaded stud 122 engages cable clamp fixed engagement portion 121. For example, cable clamp threaded stud 122 may be screwed into or molded into cable clamp fixed engagement portion 121. Cable clamp threaded stud 122 extends through an aperture defined in cable clamp movable engagement portion 120 beyond which cable clamp nut 123 engages cable clamp threaded stud 122. Cable clamp nut 123 may be rotated to increase or decrease the spacing of cable clamp aperture 125, thereby decreasing or increasing, respectively, the pressure applied by cable clamp fixed engagement portion 121 and cable clamp movable engagement portion 120 on the portion of cable 133 occupying cable clamp aperture 125. By using cable clamp nut 123 to decrease the pressure on the portion of cable 133 occupying cable clamp aperture 125, that portion of cable 133 may be removed from cable clamp aperture 125, and another cable 133 may be inserted in place thereof. Cable clamp assembly 118 is separable from the pulley housing to facilitate installation of cable 133.

Figure 2:
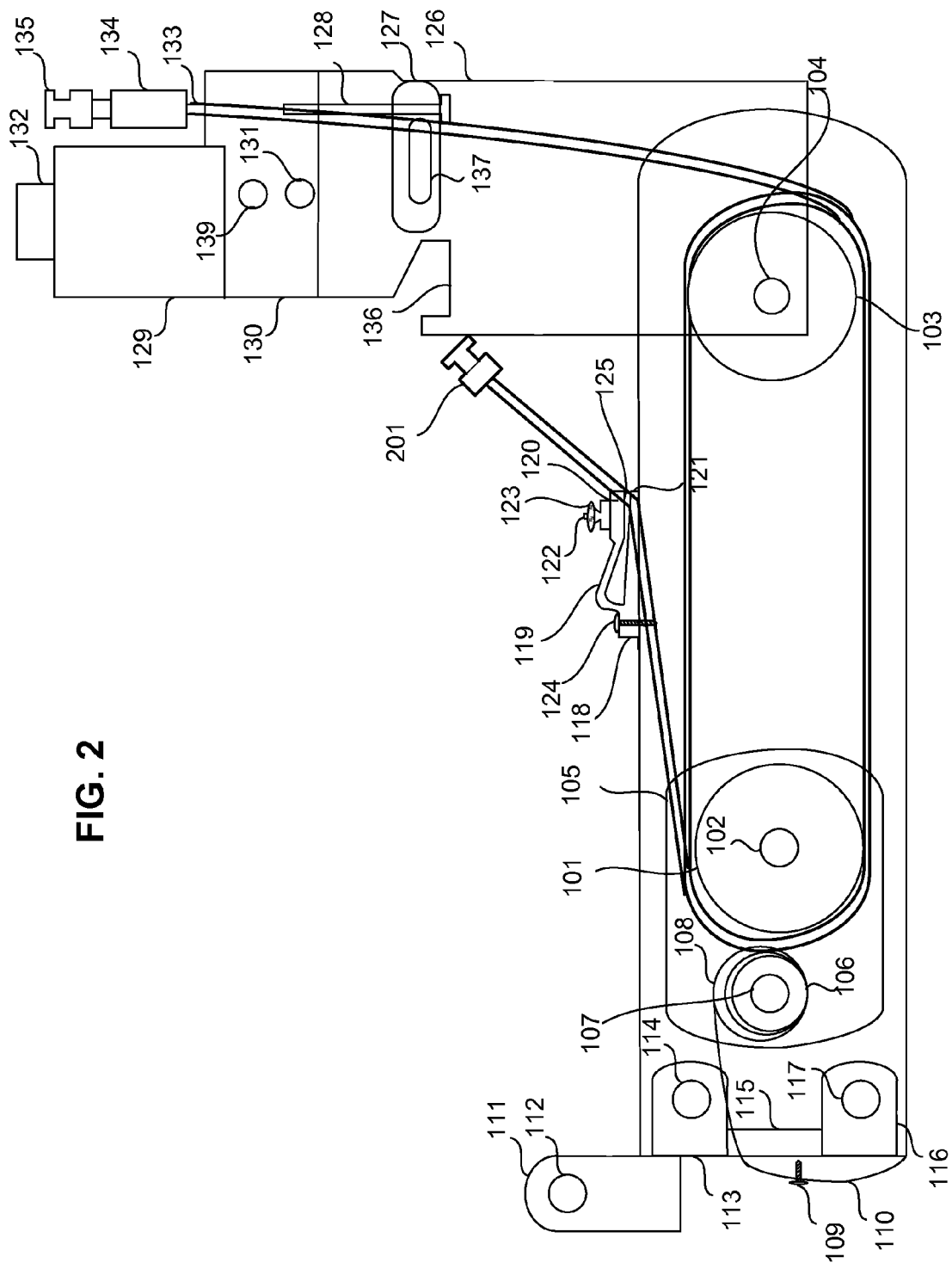
FIG. 2 is a cross sectional drawing illustrating a cable retractor with a cable installed in accordance with at least one embodiment.

FIG. 2 is a cross sectional drawing illustrating a cable retractor with a cable installed in accordance with at least one embodiment. As in FIG. 1, in accordance with at least one embodiment, a cable stop collar 134 is attached near connector 135 at one end of cable 133. Cable 133 is installed within cable stop assembly 129. Cable stop assembly 129 operably frictionally engages a first portion of cable 133. Cable 133 extends toward first pulley 103, where first pulley 103 operably engages a second portion of cable 133 around a first portion of a first circumferential surface of first pulley 103. Cable 133 extends toward second pulley 101, where second pulley 101 operably engages a third portion of cable 133 around a first portion of a second circumferential surface of second pulley 101. From second pulley 101, cable 133 extends toward first pulley 103, where first pulley 103 operably engages a fourth portion of cable 133 around a second portion of the first circumferential surface of first pulley 103. From first pulley 103, cable 133 extends toward second pulley 101, where second pulley 101 operably engages a fifth portion of the cable around a second portion of the second circumferential surface of the second pulley. From second pulley 101, cable 133 extends to cable clamp assembly 118, where cable clamp assembly 118 operably frictionally engages a sixth portion of cable 133. From cable clamp assembly 118, cable 133 extends to cable connector 201 at a second end of cable 133 opposite the end of cable 133 where cable connector 135 is attached.

The second portion of cable 133 lies between the first portion of cable 133 and the third portion of cable 133 along the length of cable 133. The third portion of cable 133 lies between the second portion of cable 133 and the fourth portion of cable 133 along the length of cable 133. The fourth portion of cable 133 lies between the third portion of cable 133 and the fifth portion of cable 133 along the length of cable 133. The fifth portion of cable 133 lies between the fourth portion of cable 133 and the sixth portion of cable 133 along the length of cable 133.

As can be seen in FIG. 2, the cable retractor allows a cable 133 to pass through the cable retractor uninterrupted, which avoids the need for slip rings to conduct the signal through the cable retractor. The use of slip rings can compromise the signal integrity and reliability because it introduces a "break" in the conductors. By allowing a cable 133 to pass through the cable retractor without interruption, the uniformity and continuity of cable characteristics, such as impedance, a moisture-proof and gastight cable sheath, mechanical flexibility, and mechanical strength, are preserved. While many uses, especially for video equipment, may involve the use of coaxial cable having a 75-ohm characteristic impedance, the ability to provide an uninterrupted cable path allows the substitution of another cable, such as a coaxial cable having a 50-ohm characteristic impedance. The impedance discontinuity that slip rings could introduce or the need for multiple sets of slip rings of different characteristic impedances can be avoided, which can reduce the opportunities for signal degradation. Also, other types of cables, such as multiple-conductor cables (including CAT5 or similar cables) can easily be accommodated in absence of slip rings.

Figure 3:
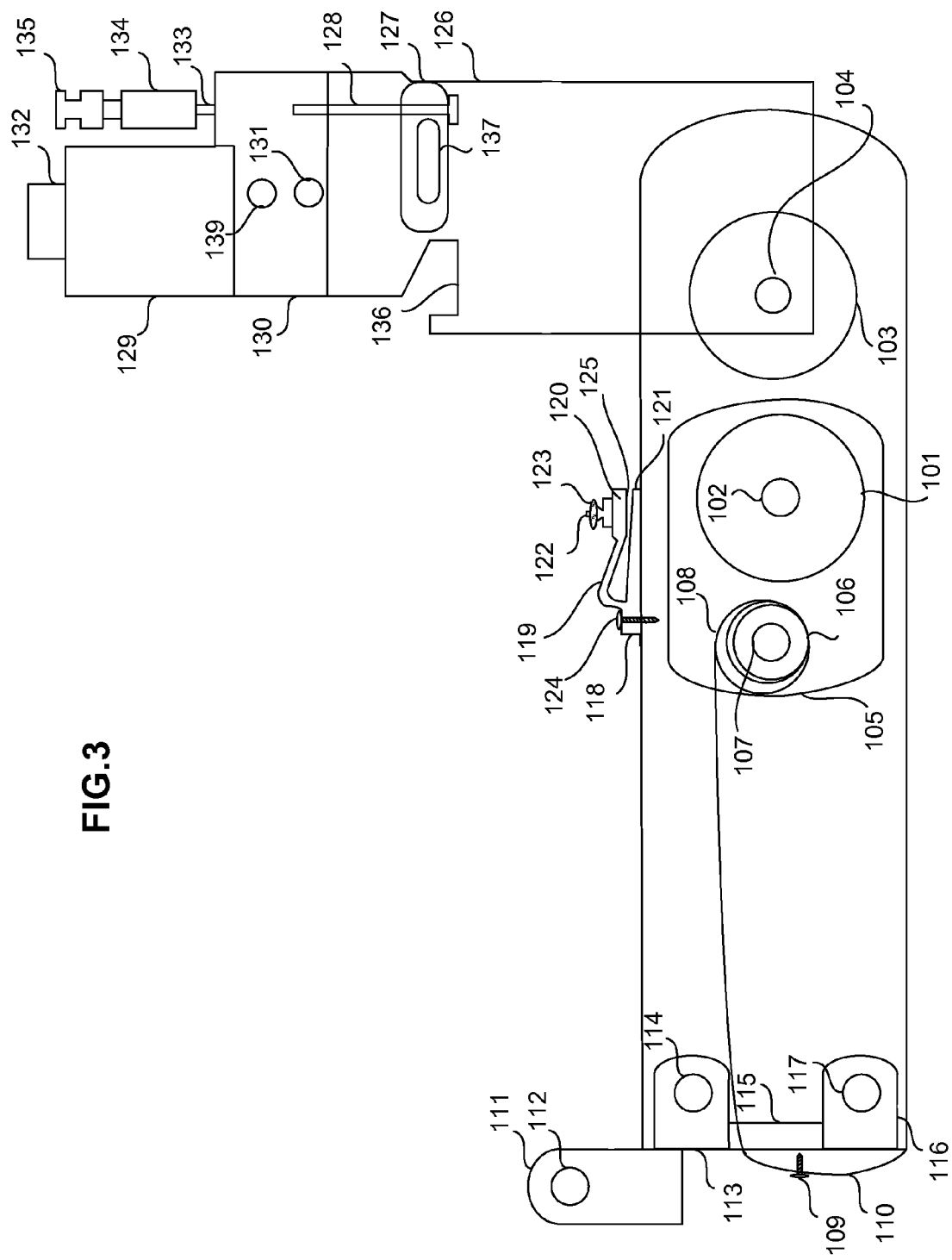
FIG. 3 is a cross sectional drawing illustrating a cable retractor with its spring extended in accordance with at least one embodiment.

FIG. 3 is a cross sectional drawing illustrating a cable retractor with its spring extended in accordance with at least one embodiment. FIG. 3 illustrates the elements shown in FIG. 1, but with spring 108 extended. With spring 108 extended, second pulley assembly 105 is translated linearly and radially with respect to first pulley 103, such that second pulley 101 is closer to first pulley 103 than when spring 108 is retracted. As spring 108 is extended, a straightened portion of spring 108 extends between second pulley assembly 105 and spring mounting block 110 of end cap 115. As spring 108 is retracted, that straightened portion of spring 108 is wound around spring axle 107, with the remainder of spring 108 around spring axle 107 rotating about spring axle 107 to accommodate the winding of the straightened portion of spring 108. Spring 108 is retracted at a rate governed by rotary damper 106.

Figure 4:
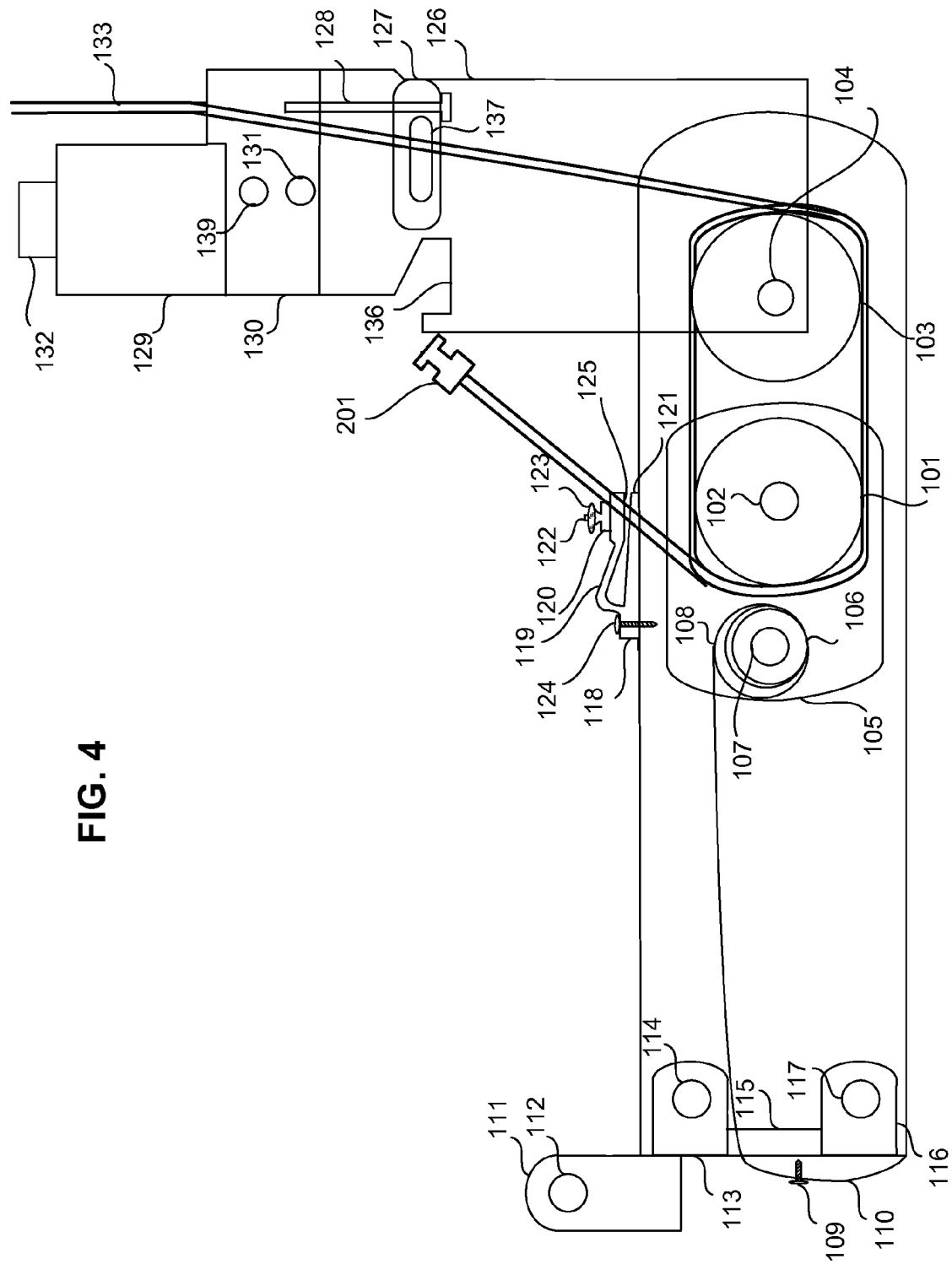
FIG. 4 is a cross sectional drawing illustrating a cable retractor with its spring extended and with a cable installed in accordance with at least one embodiment.

FIG. 4 is a cross sectional drawing illustrating a cable retractor with its spring extended and with a cable installed in accordance with at least one embodiment. FIG. 4 illustrates the elements shown in FIG. 2, with cable 133 installed, but with spring 108 extended. Cable 133 has been rotated about first pulley 103 and second pulley 101 to bring second pulley 101 closer to first pulley 103, reducing the lengths of cable 133 between first pulley 103 and second pulley 101. The motive force for such reconfiguration of the cable retractor is provided by pulling on cable stop collar 134 so as to draw a portion of cable 133 extending from cable stop collar 134 out of the cable retractor. After that portion of cable 133 is withdrawn from the cable retractor, cable stop assembly 129 operates to frictionally retain cable 133 until cable stop actuator button 132 is depressed.

When cable stop actuator button 132 is depressed, cable stop assembly 129 allows the extended portion of cable 133 to be retracted into the cable retractor. The motive force for the retraction is provided by spring 108 acting on second pulley assembly 105 to draw second pulley 101 farther from first pulley 103, thereby increasing the lengths of cable 133 between first pulley 103 and second pulley 101.

FIG. 5 is a cross sectional drawing illustrating a cable retractor in accordance with at least one embodiment. FIG. 5 illustrates the cable retractor of FIG. 1 as viewed from an angle ninety degrees from the angle of view of FIG. 1.

FIG. 6 is a cross sectional drawing illustrating a cable retractor with a cable installed in accordance with at least one embodiment. FIG. 6 illustrates the cable retractor of FIG. 2, with cable 133 installed, as viewed from an angle ninety degrees from the angle of view of FIG. 2.

Figure 7:
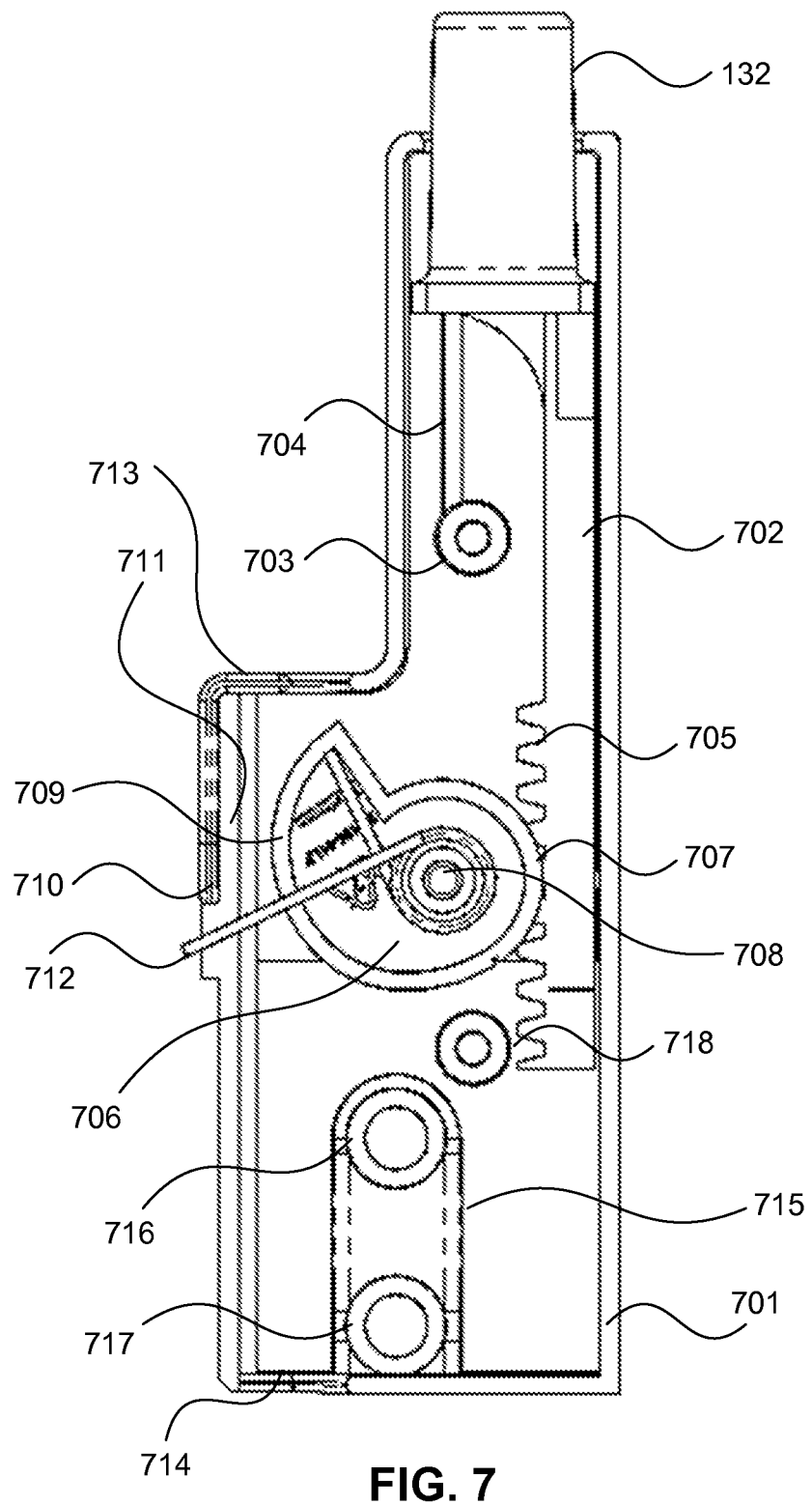
FIG. 7 is a cross sectional drawing illustrating a cable stop assembly in accordance with at least one embodiment.

FIG. 7 is a cross sectional drawing illustrating a cable stop assembly 129 in accordance with at least one embodiment. In accordance with at least one embodiment, cable stop assembly 129 comprises cable stop assembly housing 701, cable stop actuator 702, cable stop actuator button 132, upper cable stop assembly screw boss 703, cable stop actuator guide 704, cable stop actuator rack gear teeth 705, cable stop cam 706, cable stop cam pinion gear teeth 707, cable stop axle 708, cable stop cam engagement surface 709, cable stop spring 712, lower cable stop assembly screw boss 718. In accordance with at least one embodiment, cable stop spring 712 is coiled around cable stop axle 708. Cable stop assembly housing 701 comprises cable stop cam base 710, which defines cable stop cam base engagement surface slot 711. A tab defined in cable stop housing 126 projects into cable stop cam base engagement surface slot 711 to provide a cable stop cam base engagement surface so that a cable 133 can be positioned between the tab and cable stop cam engagement portion 709 of cable stop cam 706. When cable stop assembly housing 701 is disassembled from cable stop housing 126, cable stop cam base engagement surface slot 711 provides space for a cable 133 to be removed from and/or installed into cable stop assembly housing 701. Cable stop assembly housing 701 defines upper cable aperture 713 and lower cable aperture 714 to allow cable 133 to be inserted through cable stop cam base engagement surface slot 711 adjacent to cable stop cam engagement surface 709. Cable stop actuator 702 transfers the force via cable stop actuator rack gear teeth 705 and cable stop cam pinion gear teeth 707 to cable stop cam 706. Cable stop cam engagement surface 709 of cable stop cam 706 exerts force against the portion of cable 133 located between cable stop cam engagement surface 709 and the tab of cable stop 126 that fills cable stop cam base engagement portion surface slot 711, which frictionally detains cable 133, preventing cable 133 from being retracted into the cable retractor. When cable stop actuator button 132 is depressed, cable stop actuator rack gear teeth 705 operate on cable stop cam pinion gear teeth to move cable stop cam 706 so that cable stop cam engagement surface 709 moves away from the portion of cable 133 detained in cable stop assembly 129, reducing the friction with which that portion of cable 133 is detained, thereby allowing cable 133 to be retracted into the cable retractor. Such retraction can continue until cable stop collar 134 contacts cable stop assembly housing 701 or until cable stop actuator button 132 is released. As cable stop actuator button 132 is depressed, cable stop spring 712 is wound around cable stop axle 708. Cable stop spring 704 exerts force through cable stop cam pinion gear teeth 707 and cable stop actuator rack gear teeth 705 to bias cable stop actuator 702 and cable stop actuator button 132 upward (i.e., toward a released position). As cable stop actuator button 132 is released, cable stop spring 704 is unwound somewhat, relaxing somewhat the force it had applied to cable stop actuator button 132. Cable stop collar 134 is configurable to abut a portion of cable stop assembly housing 701 to limit cable retraction. Alternatively, cable stop actuator spring 712 may be implemented as, for example, a spring between cable stop actuator button 132 and a portion of cable stop assembly housing 701, such as cable stop assembly screw base 703, as a spring between cable stop actuator 702 and cable stop assembly housing 701, as a spring between cable stop cam 706 and cable stop assembly housing 701, or in other similar configurations.

Cable stop assembly housing 701 further comprises cable stop assembly boss 715, which defines upper cable stop assembly screw collar 716 and lower cable stop assembly screw collar 717, which define holes for cable stop assembly screws 139 and 131, respectively. As noted, cable stop assembly housing 701 comprises upper cable stop assembly screw boss 703 and lower cable stop assembly screw boss 718. Screws engaging upper cable stop assembly screw boss 703 and lower cable stop assembly screw boss 718 can be used to hold cable stop assembly housing 701 together.

Figure 8:
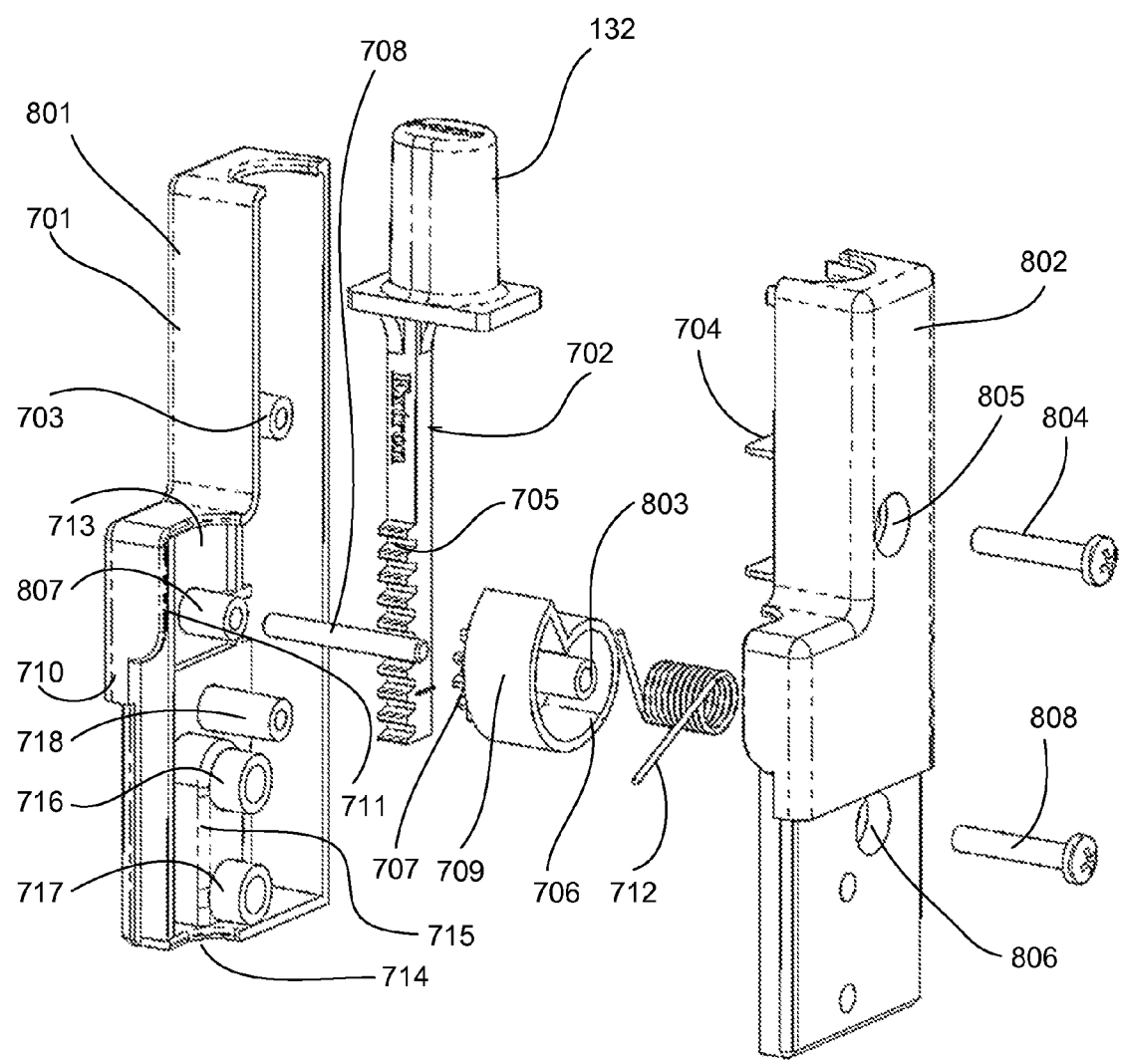
FIG. 8 is an exploded perspective drawing illustrating a cable stop assembly in accordance with at least one embodiment.

FIG. 8 is an exploded perspective drawing illustrating a cable stop assembly in accordance with at least one embodiment. Cable stop assembly 129 comprises cable stop assembly housing 701, which comprises portions 801 and 802.

Portions 801 and 802 can receive components of cable stop assembly and be assembled to form cable stop assembly 129. Cable stop cam 706 comprises cable stop cam sleeve 803, which surrounds cable stop axle 708 and is surrounded by the coiled portion of cable stop spring 712. Portion 801 of cable stop assembly 701 comprises cable stop axle boss 807, which coaxially retains cable stop axle 708 in position within cable stop assembly housing 701. Portion 801 of cable stop assembly housing 701 comprises upper cable stop assembly screw boss 703 and lower cable stop assembly screw boss 718. Portion 802 of cable stop assembly housing 701 defines upper hole 805 and lower hole 806. With the components enclosed within cable stop assembly housing 701 installed therein, portions 801 and 802 can be assembled together. When so assembled, upper hole 805 of portion 802 aligns with upper cable stop assembly screw boss 703 and lower hole 806 aligns with lower cable stop assembly screw boss 718. Upper screw 804 can be installed through upper hole 805 to engage upper cable stop assembly screw boss 703 and lower screw 808 can be installed through lower hole 806 to engage lower cable stop assembly screw boss 718, thereby fastening together portions 801 and 802 of cable stop assembly housing 701.

Thus, a cable retractor is described. Although the present invention has been described with respect to certain specific embodiments, it will be clear to those skilled in the art that the inventive features of the present invention are applicable to other embodiments as well, all of which are intended to fall within the scope of the present invention.

What is claimed is:

1. A cable retractor comprising:
   a pulley housing;
   a first pulley configured to engage a first portion of a cable coupled to said pulley housing via a first axle, said first pulley configured to rotate about said first axle;
   a second pulley assembly comprising a second pulley configured to engage a second portion of said cable coupled to said second pulley assembly configured to allow the second pulley assembly to translate with respect to the first pulley assembly;
   a first spring coupled to the second pulley assembly, wherein the first spring urges the second pulley assembly away from the first pulley;
   a cable stop housing comprising a cable stop mechanism pivotably coupled to said pulley housing via said first axle; said cable stop housing configured to pivot about said first axle.

2. The cable retractor of claim 1 wherein said cable stop mechanism comprises:
   a cable stop cam;
   a cable stop actuator.

3. The cable retractor of claim 2 wherein said cable stop actuator comprises an actuator button disposed at a first end of said cable stop actuator.

4. The cable retractor of claim 3 wherein said cable stop actuator engages said cable stop cam at a second end of said cable stop actuator.

5. The cable retractor of claim 4 wherein said cable stop housing comprises a cable engagement surface adjacent to said cable stop cam.

6. The cable retractor of claim 5 wherein said cable stop housing comprises a cable stop spring that biases a lobe of said cable stop cam towards said cable engagement surface.

7. The cable retractor of claim 6 wherein said cable stop spring engages said cable stop housing and said cable stop cam.

8. The cable retractor of claim 7 wherein said cable stop spring is disposed about an axle of said cable stop cam.

9. The cable retractor of claim 5 wherein said cable stop actuator is configured to be movable between a first position at which said lobe of said cable stop cam is biased towards said cable engagement surface and a second position at which said lobe of said cable stop cam is disposed away from said cable engagement surface.

10. The cable retractor of claim 9 wherein said cable stop spring biases said cable stop actuator towards said first position.

11. The cable retractor of claim 1 further comprising a damper coupled to the first spring to control retraction speed.

12. The cable retractor of claim 11 wherein the damper comprises a rotary damper.

13. The cable retractor of claim 1 further comprising first and second mounts for mounting said cable retractor to a cable access enclosure.

14. The cable retractor of claim 13 wherein said first mount comprises a mounting lug attached to a first end of said pulley housing.

15. The cable retractor of claim 14 wherein said second mount comprises an orifice formed in said cable stop housing.

16. A cable retractor comprising:
   a pulley housing;
   a first pulley configured to engage a first portion of a cable coupled to said pulley housing via a first axle, said first pulley configured to rotate about an axis;
   a second pulley assembly comprising a second pulley configured to engage a second portion of said cable coupled to said second pulley assembly configured to allow the second pulley assembly to translate with respect to the first pulley assembly;
   a first spring coupled to the second pulley assembly, wherein the first spring urges the second pulley assembly away from the first pulley;
   a cable stop housing comprising a cable stop mechanism pivotably coupled to said pulley housing adjacent to said first pulley; said cable stop housing configured to pivot about said axis.

17. The cable retractor of claim 16 wherein said cable stop mechanism comprises:
   a cable stop cam;
   a cable stop actuator.

18. The cable retractor of claim 16 further comprising a damper coupled to the first spring to control retraction speed.

19. The cable retractor of claim 16 wherein said cable stop actuator comprises an actuator button disposed at a first end of said cable stop actuator.

20. A cable retractor comprising:
   a pulley housing;
   a first pulley configured to engage a first portion of a cable coupled to said pulley housing via a first axle, said first pulley configured to rotate about a first axis;
   a second pulley assembly comprising a second pulley configured to engage a second portion of said cable coupled to said second pulley assembly configured to allow the second pulley assembly to translate with respect to the first pulley assembly;
   a first spring coupled to the second pulley assembly, wherein the first spring urges the second pulley assembly away from the first pulley;
   a cable stop housing comprising a cable stop mechanism pivotably coupled to said pulley housing adjacent to said first pulley; said cable stop housing configured to pivot about a second axis;
   wherein said cable stop housing is configured to engage a cable access enclosure; and wherein said cable stop housing comprises a cable access enclosure engagement notch configured to engage said cable access enclosure.

21. The cable retractor of claim 20 wherein said cable stop housing comprises a cable access enclosure engagement slot configured to receive a rod for securing said cable retractor to said cable access enclosure.

22. The cable retractor of claim 21 wherein said cable stop housing comprises a cable access enclosure mounting block comprising a slot configured to receive said rod.

23. The cable retractor of claim 22 wherein said cable access enclosure mounting block comprises a cable access enclosure mounting block screw configured to secure said cable access enclosure mounting block to said rod.

24. The cable retractor of claim 21 wherein said pulley housing comprises a mounting lug comprising a mounting lug aperture configured to receive a rod.

25. The cable retractor of claim 20 wherein said cable stop housing comprises a cable access enclosure engagement slot configured to receive a fastener for securing said cable retractor to said cable access enclosure.

26. The cable retractor of claim 25 wherein said cable stop housing comprises a cable access enclosure mounting block comprising a slot configured to receive said fastener.

27. The cable retractor of claim 26 wherein said cable access enclosure mounting block comprises a cable access enclosure mounting block screw configured to secure said cable access enclosure mounting block to said fastener.

28. The cable retractor of claim 25 wherein said pulley housing comprises a mounting lug comprising a mounting lug aperture configured to receive a fastener.

29. A cable retractor comprising:
a first pulley assembly;
a second pulley assembly configured to allow the second pulley assembly to translate radially with respect to the first pulley assembly;
a first spring coupled to the second pulley assembly, wherein the first spring urges the second pulley assembly away from the first pulley assembly;
a cable stop assembly operable to frictionally engage a first portion of a cable disposed about the first and second pulley assemblies;
a pulley housing in which the first pulley assembly and the second pulley assembly are disposed; and
a cable stop housing in which the cable stop assembly is disposed, wherein the pulley housing is pivotably attached to the cable stop housing.

30. The cable retractor of claim 29 further comprising:
a cable clamp assembly attached to the pulley housing.

* * * * *